US 11,599,681 B2

United States Patent
Araki et al.

(10) Patent No.: US 11,599,681 B2
(45) Date of Patent: Mar. 7, 2023

(54) BIT DECOMPOSITION SECURE COMPUTATION APPARATUS, BIT COMBINING SECURE COMPUTATION APPARATUS, METHOD AND PROGRAM

(71) Applicants: NEC CORPORATION, Tokyo (JP); BAR-ILAN UNIVERSITY, Ramat Gan (IL)

(72) Inventors: Toshinori Araki, Tokyo (JP); Kazuma Ohara, Tokyo (JP); Jun Furukawa, Herzliya (JP); Lindell Yehuda, Ramat Gan (IL); Nof Ariel, Ramat Gan (IL)

(73) Assignees: NEC CORPORATION, Tokyo (JP); BAR-ILAN UNIVERSITY, Ramat Gan (IL)

( * ) Notice: Subject to any disclaimer, the term of this patent is extended or adjusted under 35 U.S.C. 154(b) by 594 days.

(21) Appl. No.: 16/614,259

(22) PCT Filed: May 18, 2017

(86) PCT No.: PCT/JP2017/018745
§ 371 (c)(1),
(2) Date: Nov. 15, 2019

(87) PCT Pub. No.: WO2018/211675
PCT Pub. Date: Nov. 22, 2018

(65) Prior Publication Data
US 2021/0157955 A1 May 27, 2021

(51) Int. Cl.
*G06F 21/78* (2013.01)
*G06F 7/501* (2006.01)
(Continued)

(52) U.S. Cl.
CPC .............. *G06F 21/78* (2013.01); *G06F 7/501* (2013.01); *G06F 7/727* (2013.01); *G06F 21/82* (2013.01);
(Continued)

(58) Field of Classification Search
CPC .......... G06F 21/78; G06F 7/501; G06F 7/727; G06F 21/82; H04L 9/3026; H04L 9/08; H04L 9/002
(Continued)

(56) References Cited

U.S. PATENT DOCUMENTS 8,077,862 B2   12/2011   Schneider
9,715,595 B2   7/2017    Patey et al.
(Continued)

FOREIGN PATENT DOCUMENTS

EP    3 091 690 A1      11/2016
WO    2015/053185 A1    4/2015
(Continued)

OTHER PUBLICATIONS

Koji Chida et al., "A Lightweight Three-party Secure Function Evaluation with Error Detection and Its Experimental Result", Information Processing Society of Japan, Sep. 2011, pp. 2674-2685, vol. 52, No. 9.
(Continued)

*Primary Examiner* — Thanh T Le
(74) *Attorney, Agent, or Firm* — Sughrue Mion, PLLC

(57) ABSTRACT

The present invention provides a bit decomposition secure computation system comprising: a share value storage apparatus to store share values obtained by applying (2, 3) type RSS using modulo of power of 2 arithmetic; a decomposed share value storage apparatus to store a sequence of share values obtained by applying (2, 3) type RSS using modulo 2 arithmetic; and a bit decomposition secure computation
(Continued)

apparatus that, with respect to sharing of a value w, r1, r2, and r3 satisfying w=r1+r2+r3 mod $2^n$, where ^ is a power operator and n is a preset positive integer, being used as share information by the (2, 3) type RSS stored in the share value storage apparatus, includes: an addition sharing unit that sums two values out of r1, r2 and r3 by modulo $2^n$, generates and distributes a share value of the (2, 3) type RSS with respect to the sum; and a full adder secure computation unit that executes addition processing of the value generated by the addition sharing unit and a value not used by the addition sharing unit, for each digit, by using secure computation of a full adder, and stores the result in the decomposed share value storage apparatus.

6 Claims, 7 Drawing Sheets

(51) Int. Cl.

| | | |
|---|---|---|
| G06F 21/82 | (2013.01) | |
| H04L 9/08 | (2006.01) | |
| G06F 7/72 | (2006.01) | |
| H04L 9/00 | (2022.01) | |
| H04L 9/30 | (2006.01) | |

(52) U.S. Cl.
CPC ............... H04L 9/08 (2013.01); *H04L 9/002* (2013.01); *H04L 9/3026* (2013.01)

(58) Field of Classification Search
USPC .......................................................... 726/26
See application file for complete search history.

(56) References Cited

U.S. PATENT DOCUMENTS

| | | | |
|---|---|---|---|
| 9,906,505 B2 | 2/2018 | Peeters et al. | |
| 2003/0044004 A1* | 3/2003 | Blakley | H04L 63/0428 380/28 |
| 2007/0206784 A1* | 9/2007 | Blakley | G06F 7/723 380/28 |
| 2009/0136024 A1 | 5/2009 | Schneider | |
| 2015/0347781 A1 | 12/2015 | Patey et al. | |
| 2016/0218862 A1* | 7/2016 | Ikarashi | H04L 9/085 |
| 2017/0012948 A1 | 1/2017 | Peeters et al. | |
| 2017/0278433 A1* | 9/2017 | Furukawa | G09C 1/00 |
| 2017/0324554 A1* | 11/2017 | Tomlinson | H04L 9/0838 |
| 2018/0158377 A1 | 6/2018 | Ikarashi et al. | |
| 2018/0270057 A1* | 9/2018 | Furukawa | G06F 7/5443 |
| 2021/0090072 A1* | 3/2021 | Sewell | G06Q 20/0658 |

FOREIGN PATENT DOCUMENTS

| | | |
|---|---|---|
| WO | 2016/042693 A1 | 3/2016 |
| WO | 2016/208437 A1 | 12/2016 |
| WO | 2017/038761 A1 | 3/2017 |

OTHER PUBLICATIONS

Dai Ikarashi et al., "O(I) Bits Communication Bit Decomposition and O(|p'|) Bits Communication Modulus Conversion for Small k secret-sharing-based Secure Computation", Computer Security Symposium 2013, Oct. 21-23, S013, pp. 785-792.
Toshinori Araki et al., "High-Throughput Semi-Honest Secure Three-Party Computation with an Honest Majority", CCS '16 Proceedings of the 2016 ACM SIGSAC Conference on Computer and Communications Security, pp. 805-817.
Toshinori Araki et al., "Secure Three-Party Computation with Low Communication and Its Implementation via Bit-Slicing", Abstracts of 2017 Symposium on Cryptography and Information Security (SCIS 2017), Jan. 24, 2017, pp. 1-7, 2D3-5.
Martine De Cock et al., "Efficient and Private Scoring of Decision Trees, Support Vector Machines and Logistic Regression Models based on Pre-Computation", IEEE Transactions on Dependable and Secure Computing, [Online], 2017, 03, 07, [Retrieved on Aug. 9, 2017.] Retrieved from the Internet <URL:http://doi.org/10.1109/TDSC.2017.2679289>.
Written Opinion for PCT/JP2017/018745, dated Aug. 22, 2017.
International Search Report for PCT/JP2017/018745, dated Aug. 22, 2017.

* cited by examiner

[Fig. 1]
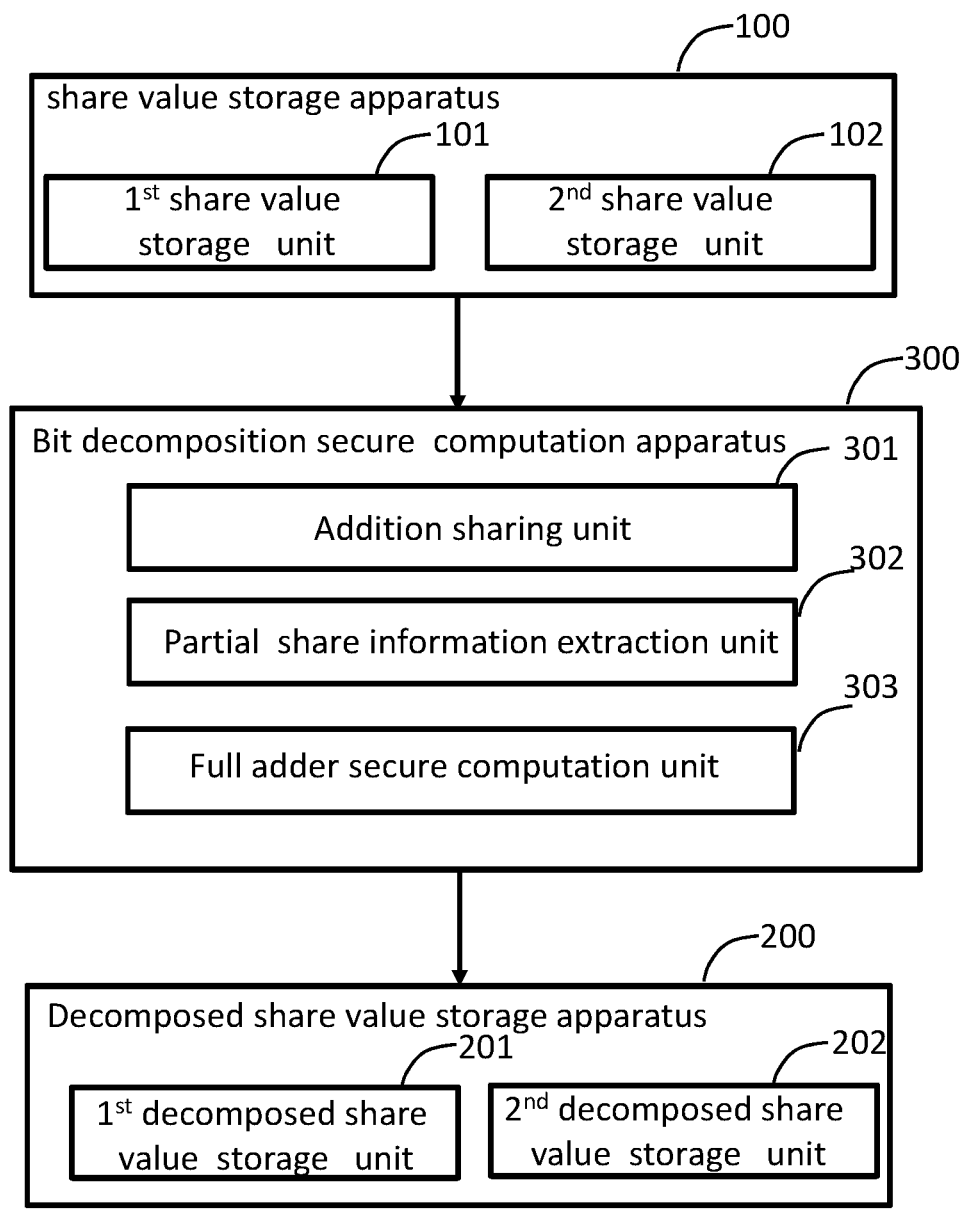

[Fig. 2]
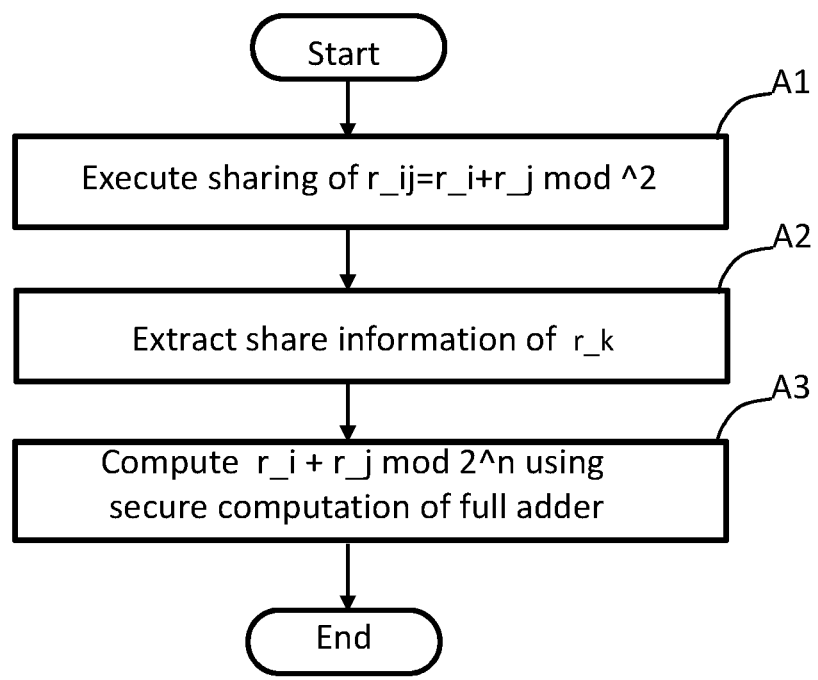

[Fig. 3]
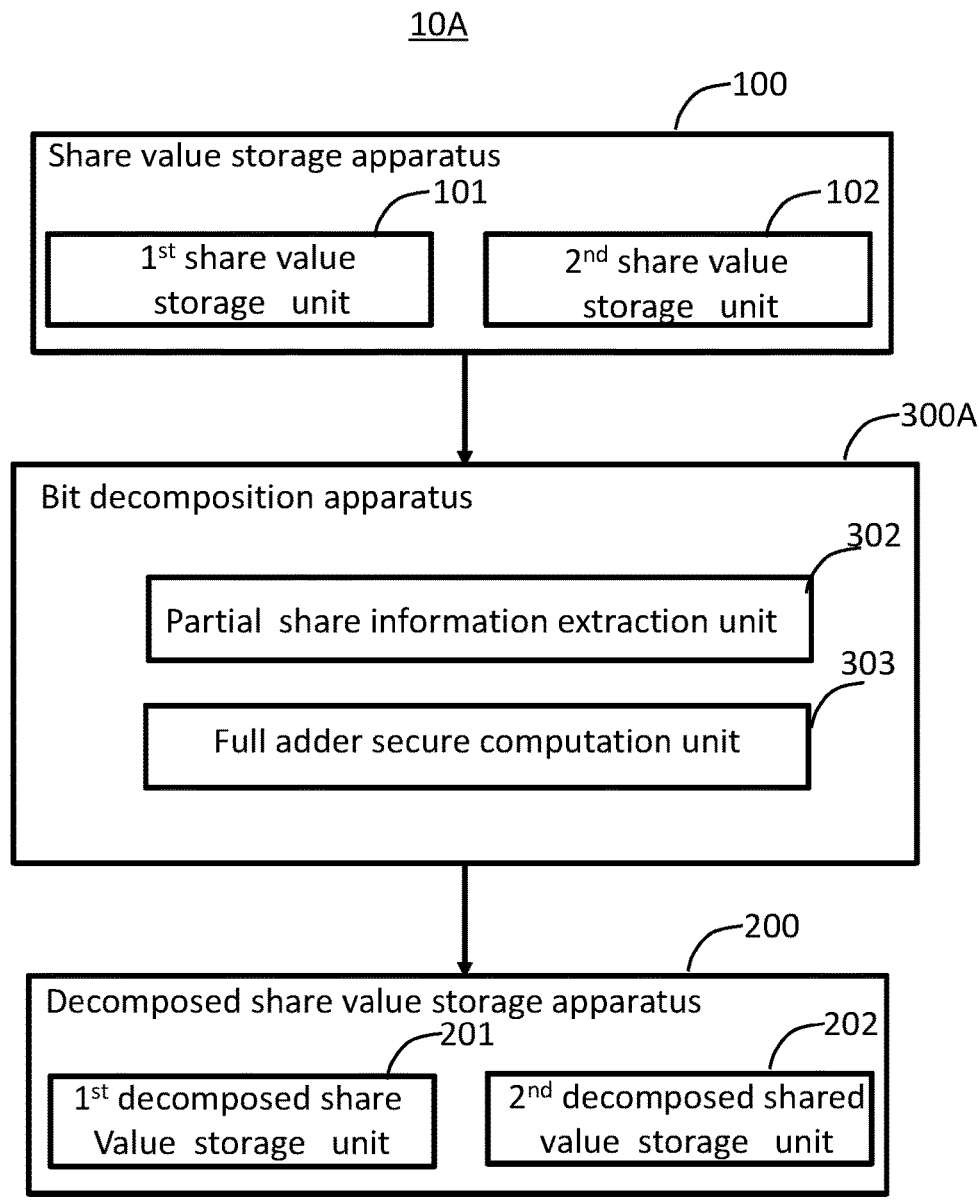

[Fig. 4]
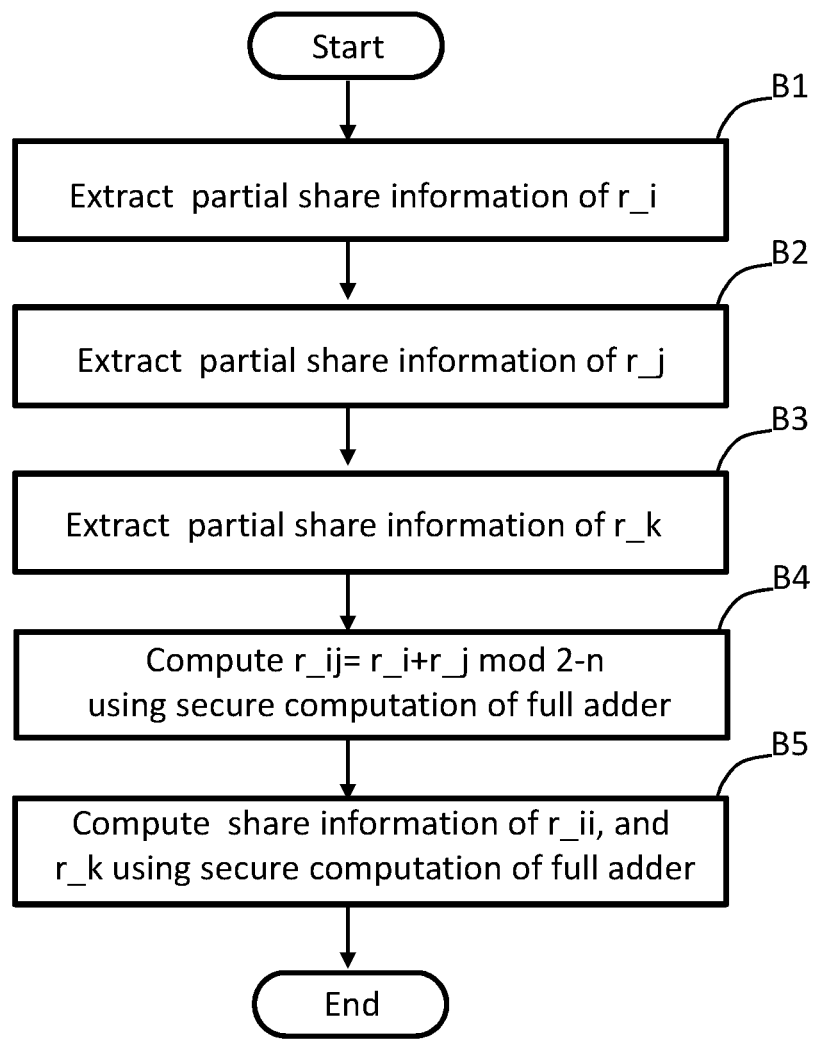

[Fig. 5]
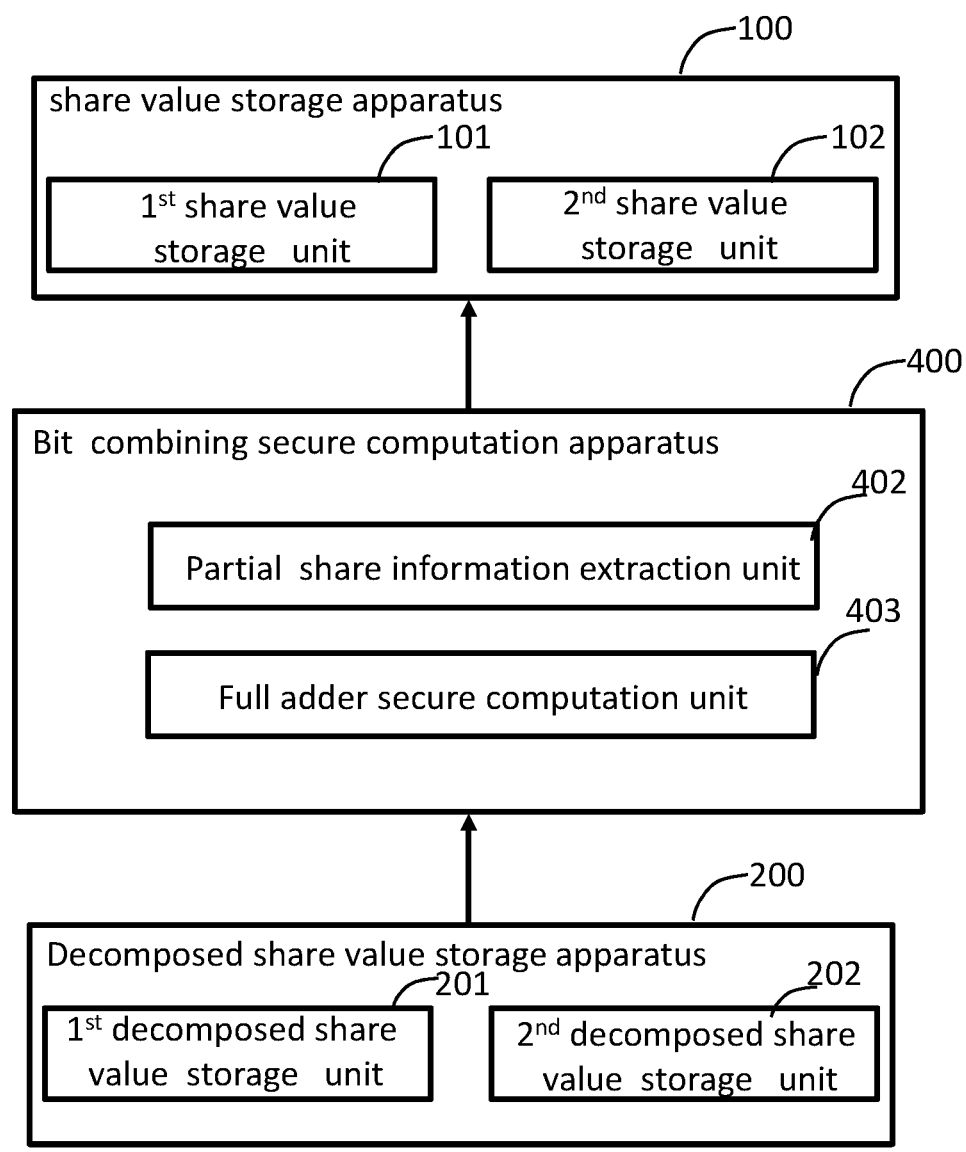

[Fig. 6]
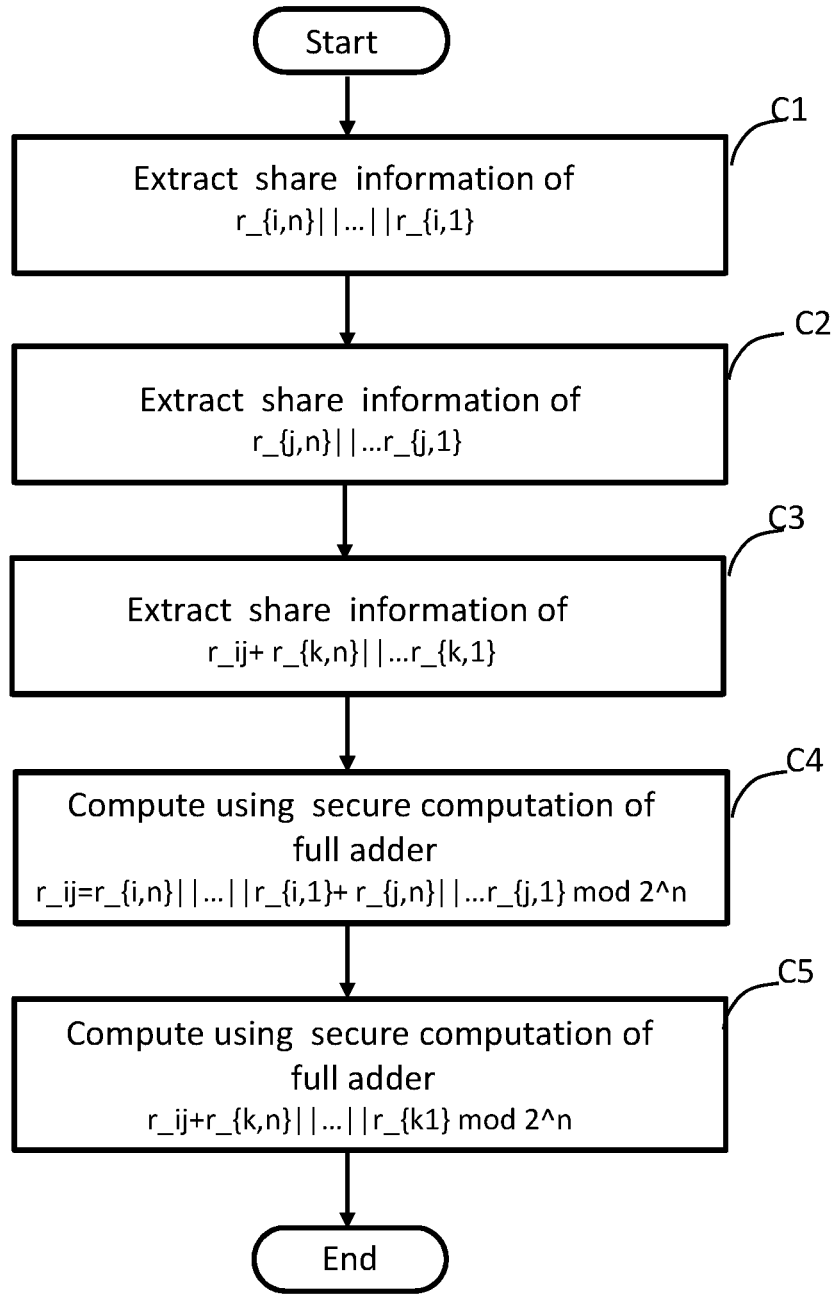

[Fig. 7]
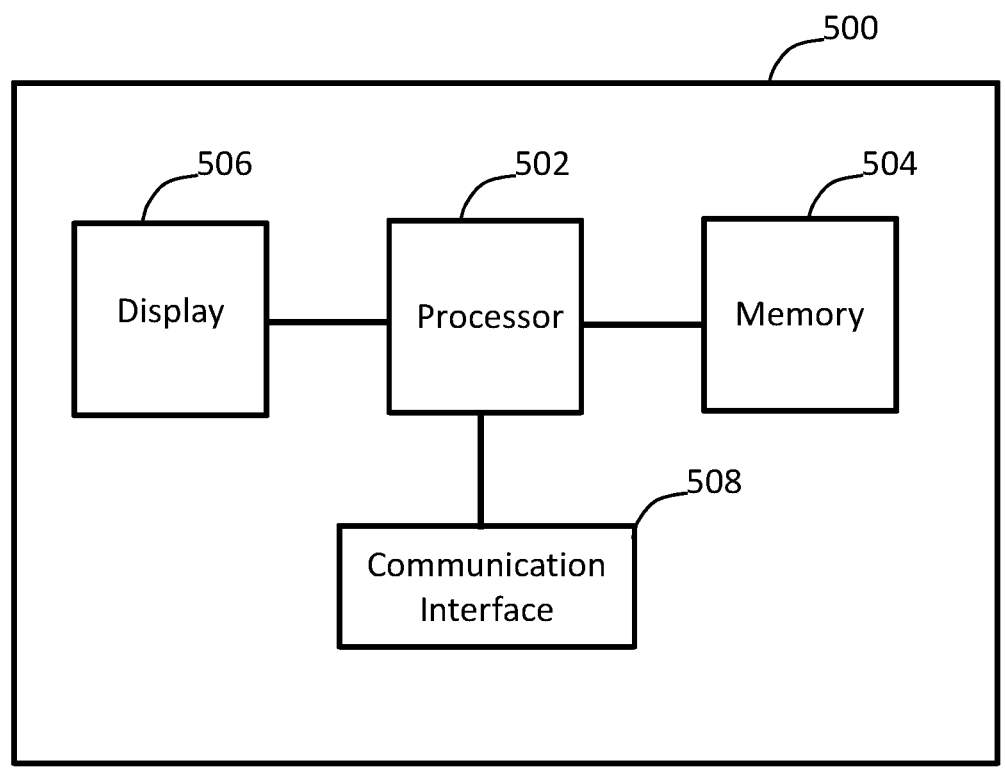

BIT DECOMPOSITION SECURE COMPUTATION APPARATUS, BIT COMBINING SECURE COMPUTATION APPARATUS, METHOD AND PROGRAM

CROSS REFERENCE TO RELATED APPLICATIONS

This application is a National Stage of International Application No. PCT/JP2017/018745 filed May 18, 2017.

FIELD

The present invention relates to a bit decomposition secure computation apparatus, bit combining secure computation apparatus, method and program.

BACKGROUND

A secure computation scheme is a technology that can allow a computer system to conceal computation process and result against related parties. By performing secret sharing of data to store shares in a plurality of servers managed by a third party such as a cloud, it is possible to execute any operation on the data. Since data, computation process, and computation result are not known to the third party, the secure computation can be used, as an example, for outsourcing of analysis processing or the like of sensitive information such as personal information, though not limited thereto.

The following describes secure computation using replication type secret shared (hereinafter referred to as (2, 3) type RSS) having (2, 3) threshold access structure, as a premise of the present invention that relates to a secure computation using (2, 3) type RSS.

(2, 3) threshold type RSS is one of implementation methods of (2, 3) secret sharing schemes. The (2, 3) secret sharing scheme is a scheme such that three items of share information are generated from input values, and from one or less items of share information, an original information is not known, while the original value can be reconstructed from two or more items of share information.

In (2, 3) type RSS, in secret sharing of a value x of from 0 to p−1 or less, a set of three values r1, r2, and r3 each from 0 to p−1 or less such that x=r1+r2+r3 mod p, is generated, and, as three items of sharing information, three tuples are used, wherein the three tuples each have two values selected from (r1, r2, r3), different to each other, thereby implementing (2, 3) secret sharing. It is noted that p is called a modulus.

A method for executing computation on shares distributed by secret sharing without reconstruction is called secure computation. The following describes a secure computation method for a value shared (distributed) with the (2, 3) RSS scheme that relates to the present invention.

First, a sharing method of a value will be described, and then addition, subtraction, and multiplication will be described. Here, a procedure will be described in which a plurality of values each are shared by three apparatuses and secure computation is performed on the shares (share values). Here, three apparatuses are distinguished by calling them apparatus 1, apparatus 2, and apparatus 3.

<Value-Sharing Scheme>

In secret-sharing of a value w of 0 or more and less than p, where p is an integer of 2 or more, r1, r2, and r3 that are randomly selected so as to satisfy w=r1+r2+r3 mod p are generated and stored as follows. The apparatus 1 stores (r1, r2) in a storage thereof as a share value of w. The apparatus 2 stores (r2, r3) in a storage thereof as a share value of w. The apparatus 2 stores (r3, r1) in a storage thereof as a share value of w.

It can be confirmed that w cannot be obtained in any one of the parties (apparatuses 1 to 3) because each of the parties lacks one of r1, r2, and r3, but w can be reconstructed from share values stored in two or more parties.

<Addition Processing>

The following describes an addition processing executed with respect to sharing of a value w and a value w' stored in a distributed manner in the apparatus 1, the apparatus 2, and the apparatus 3, by the above-described method. Here, it is assumed that r1, r2, and r3 are randomly selected to satisfy w=r1+r2+r3 mod p, and r1', r2', and r3' are randomly selected to satisfy w'=r1'+r2'+r3' mod p.

The apparatus 1 stores (s1, t1)=(r1, r2) as a share value of w and (s1', t1')=(r1', r2') as a share value of w', in a storage thereof.

The apparatus 2 stores (s2, t2)=(r2, r3) as a share value of w and (s2', t2')=(r2', r3') as a share value of w', in a storage thereof.

The apparatus 3 stores (s3, t3)=(r3, r1) as a share value of w and (s3', t3')=(r3', r1') as a share value of w', in a storage thereof.

The apparatus 1 to 3 respectively perform processing according to the following procedure.

The apparatus 1 calculates (s1", t1") by $$(s1", t1")=(r1"=s1+s1' \bmod p, r2"=t1+t1' \bmod p)$$

and stores (s1", t1") in a storage thereof, as a share value of w+w'.

The apparatus 2 calculates (s2", t2") by $$(s2", t2")=(r2"=s2+s2' \bmod p, r3"=t2+t2' \bmod p)$$

and stores (s2", t2") in a storage thereof, as a share value of w+w'.

The apparatus 3 calculates (s3", t3") by $$(s3", t3")=(r3"=s3+s3' \bmod p, r1"=t3+t3' \bmod p)$$

and stores (s3", t3") in a storage thereof, as a share value of w+w'.

Each computation result of the apparatuses 1 to 3 is a share value of w+w' that is shared using r1", r2" and r3" which satisfy: w+w'=r1"+r2"+r3" mod p.

This can be confirmed by r1"+r2"+r3"=(r1+r2+r3)+(r1'+r2'+r3')=w+w' mod p.

<Subtraction Processing>

The following describes a subtraction processing executed with respect to sharing of a value w and a value w' stored in a distributed manner in the apparatus 1, the apparatus 2, and the apparatus 3 by the above described method. It is assumed that w=r1+r2+r3 mod p, and w'=r1'+r2'+r3' mod p.

The apparatus 1 stores (s1, t1)=(r1, r2) as a share value of w and (s1', t1')=(r1', r2') as a share value of w', in a storage thereof.

The apparatus 2 stores (s2, t2)=(r2, r3) as a share value of w and (s2', t2')=(r2', r3') as a share value of w', in a storage thereof.

The apparatus 3 stores (s3, t3)=(r3, r1) as a share value of w and (s3', t3')=(r3', r1') as a share value of w', in a storage thereof.

The apparatuses 1 to 3 respectively perform processing according to the following procedure.

The apparatus 1 calculates (s1", t1") by (s1", t1")=(r1", s1−s1' mod p, r2"=t1−t1' mod p) and stores (s1", t1"), in a storage thereof, as a share value of w−w'.

The apparatus 2 calculates (s2", t2") by (s2", t2")=(r2", s2−s2' mod p, r3"=t2−t2' mod p) and stores (s2", t2"), in a storage thereof, as a share value of w−w'.

The apparatus 3 calculates (s3", t3") by (s3", t3")= (r3"=s3−s3' mod p, r1"=t3−t3' mod p) and stores (s3", t3"), in a storage thereof, as a share value of w−w'.

Each computation result of the apparatuses 1 to 3 is a share value of w−w' that is shared using r1", r2" and r3" which satisfy: w−w'=r1"+r2"+r3" mod p.

This can be confirmed by r1"+r2"+r3"=(r1+r2+r3)−(r1'+r2'+r3')=w−w' mod p.

<Multiplication Processing>

The following describes a multiplication processing executed with respect to values w and w' stored in the apparatuses 1, 2, and 3 by the above described method.

First describes what value each apparatus stores. It is assumed that r1 r2 and r3 are randomly selected values that satisfy r1+r2+r3=w mod p, and r1'.r2', r3' are randomly selected values that satisfy r1'+r2'+r3'=w' mod $2^n$.

The apparatus 1 stores (s1, t1)=(r1, r2) as a share value of w and (s1', t1')=(r1', r2') as a share value of w', in a storage thereof.

The apparatus 2 stores (s2, t2)=(r2, r3) as a share value of w and (s2', t2')=(r2', r3') as a share value of w', in a storage thereof.

The apparatus 3 stores (s3, t3)=(r3, r1) as a share value of w and (s3', t3')=(r3', r1') as a share value of w', in a storage thereof.

The apparatuses 1 to 3 respectively perform processing according to the following procedures.

The apparatus 1, apparatus 2 and apparatus 3 are assumed to store respectively r1", r2", and r3" as randomly selected values that satisfy r1"+r2"+r3"=0 mod $2^n$. r1", r2" r3" that satisfy such a property are required by disposal, each time multiplication is executed. A method for efficiently generating such three values by three apparatuses will be described later.

The apparatus 1 calculates u2=s1 s1'+s1 t1'+t1 s1'+r1" mod p and sends u2 to the apparatus 2.

The apparatus 2 calculates u3=s2 s2'+s2 t2'+t2 s2'+r2" mod p and sends u3 to the apparatus 3.

The apparatus 3 calculates u1=s3 s3'+s3 t3'+t3 s3'+r3" mod p and sends u1 to the apparatus 1.

The apparatus 1 stores (u1, u2), in a storage thereof, as a share value of ww'.

The apparatus 2 stores (u2, u3), in a storage thereof, as a share value of ww'.

The apparatus 3 stores (u3, u1), in a storage thereof, as a share value of ww'.

The following can be confirmed.

$$u1+u2+u3=r1r1'+r1r2'+r2r1'+r2r2'+r2r3'+r3r2'+r3r3'+r3r1'+r1r3'+r1''+r2''+r3''=(r1+r2+r3)(r1'+r2'+r3')+r1''+r2''+r3''=ww' \bmod p.$$

From the values stored in apparatus 1 and apparatus 2 by using the same computation method, ww' mod p can be calculated. The same applies to combinations of other apparatuses. According to such a method, the multiplication on w and w' both shared by using (2, 3) type RSS is executed without reconstructing each value, and a value obtained by sharing of ww' by applying (2, 3) type RSS can be shared.

<Generation of Random Numbers>

The following describes a method for generating three values, addition of which become 0, without communication among the apparatus 1, the apparatus 2 and the apparatus 3, in large quantities, in such a manner in which a value that the apparatus possess is not known to other apparatuses. Here, a method for generating r[i, 1], r[i, 2], r[i, 3], which satisfy r[i, 1]+r[i, 2]+r[i, 3]=0 mod $2^n$, for i=1, ..., N, where N is a relatively large number, will be described.

Suppose a pseudo random number generator (PRG) outputting an n-bit numeric string with key and index as input is provided. The index may be a counter or the like. This method is described in NPL 3 and the like.

First of all, as a setup process of the apparatus, L1, L2, and L3 which are keys of PRG are generated. Let L1 and L3 be stored in the apparatus 1, L2 and L1 in the apparatus 2 and L3 and L2 in the apparatus 3.

It is assumed that each of the apparatuses 1 to 3 shares an index idx synchronized with a counter or the like.

The apparatus 1 supplies the key L1 and the index idx to the PRG, and generates, as an output of the PRG, a value of n bits numeric value r'[1]. The apparatus 1 also supplies the key L3 and index idx to the PRG, and generates, as an output of the PRG, a value of n bits numeric value r'[3]. Then, the apparatus 1 obtains:

$$r[1]=r'[1]-r'[3] \bmod p.$$

The apparatus 2 supplies the key L2 and the index idx to the PRG, and generates, as an output of the PRG, the value of n bits numeric value r'[2]. The apparatus 2 also supplies the key L1 and index idx into PRG, and generates, as an output of the PRG, a value of n bits numeric value r'[1]. Then, the apparatus 2 obtains:

$$r[2]=r'[2]-r'[1] \bmod p.$$

The apparatus 3 supplies the key L3 and the index idx to the PRG, and generates, as an output of the PRG, n bits numeric value r'[3]. The apparatus 2 also supplies the key L2 and index idx into PRG, and generates, as an output of the PRG, a value of n bits numeric value r'[2]. Then, the apparatus 3 obtains:

$$r[3]=r'[3]-r'[2] \bmod p.$$

The following holds:

$$r[1]+r[2]+r[3]=r'[1]-r'[3]+r'[2]-r'[1]+r'[3]-r'[2]=0 \bmod p.$$

All N sets satisfy the above condition.

Focusing attention on the value: r[1]=r'[1]−r'[3] mod p that is generated by the apparatus 1, the apparatus 3 cannot obtain r'[1], and the apparatus 2 cannot obtain r'[3].

From this, it can be seen that the apparatus 2 and the apparatus 3 cannot calculate r[1]. The same may be said to r[2] and r[3].

As long as the setup process has been completed, the above process can be executed, even before the computation is performed, for example.

In the above described secure computation using the (2, 3) type RSS, if p=2, multiplication can be regarded as AND (logical product) processing and addition/subtraction can be regarded as exclusive OR processing. Thus, when p=2, it may be said that the above computation is secure computation suited to logic operation. Also, assuming that all items of share information of the apparatuses 1 to 3 are (1, 1), (1, 1), and (1, 1), these becomes share information of a value 1, with r1=1, r2=1, and r3=1, thereby forming a complete system with a logical product, an exclusive OR, and a constant 1 to allow arbitrary operation to be executed.

The above method is described in NPL 1 and the like. Various variations can be adopted as such a method. For example, regarding r1+r2+r3=w mod p, (r1−r2 mod p, r2), (r2−r3 mod p, r3), and (r3−r1 mod p, r1), may be used as share information. A scheme in which 3 apparatuses each hold information corresponding to two different sets out of r1, r2, and r3 may be called as (2, 3) type RSS.

Regarding RSS, an arbitrary operation can be processed by using (2, 3) type RSS with p=2. However, since it is inefficient to execute all processing with logical operation, such an operation that can be configured by multiplication and addition had better to be performed by secure computation using (2, 3) type RSS with p set to a larger value.

In addition, there are cases where it is desirable to combine numerical operation and logical operation. As an example, in a case of receiving a, b and c as inputs and processing a*b mod $2^4$<c, with a, b, and c being smaller than $2^4$ (where ^ is a power operator), it is desirable to process a*b as a numerical operation, and to process comparison operation as a logical operation. Although it is desirable to compute a*b as a numerical operation, it is difficult to express the process of comparing a*b with c as a numerical operation.

In order to solve such a problem, a process called bit decomposition described in NPL 2 is known. Bit decomposition is a process for converting share information for numerical computation into share information for logical operation.

It is assumed that sharing of a value w=5 is performed by (2, 3) type RSS using p=8, and the apparatus 1 stores (1, 2), the apparatus 2 stores (2, 2) and the apparatus 3 stores (2, 1).

By using bit decomposition, from these items of information, it is possible to obtain share information for each bit of 1, 0, and 1, of a binary representation of 5 (=101).

More specifically, after bit decomposition is performed, the apparatus 1 possesses (1, 1) for the first bit, (0, 1) for the second bit, (1, 0) for the third bit, and (0, 0) for the fourth bit.

The apparatus 2 possesses (1, 1) for the first bit, (1, 1) for the second bit, (0, 0) for the third bit, and (0, 0) for the fourth bit.

The apparatus 3 possesses (1, 1) for the first bit, (1, 0) for the second bit, (0, 0) for the third bit, and (0, 0) for the fourth bit.

The following describes the outline of the method described in NPL 2, as a related technique regarding bit decomposition. This method performs bit decomposition in the following procedure.

It is assumed that a value to be decomposed is shared by using r1, r2, and r3 which satisfy r=r1+r2+r3 mod p NPL 2 uses a Mersenne prime number represented by p=$2^n$−1. Properties of a Mersenne prime number contribute to efficient computation of s in step 2.

<Procedure 1>

Execute sharing of r12=r1+r2 mod p, and r3.

<Procedure 2>

Determine whether or not r12+r3 is greater than p, and execute secure computation, such that s=1, if r12+r3 is greater than p, and s=0 otherwise.

<Procedure 3>

Execute secret computation of r12+r3+s mod $2^n$ by a full adder for each bit from a lower digit.

According to the method of NPL 2, there is description that bit decomposition can be performed by communication amount of 10n+4 bits, assuming that p is a number of n bits.

[NPL 1]

Koji CHIDA, Dai IKARASHI, Koki HAMADA and Katsumi TAKAHASHI, "A Lightweight Three-party Secure Function Evaluation with Error Detection and Its Experimental Result", Vol. 52, No. 9, 2674-2685, September 2011

[NPL 2]

Dai IKARASHI, Koki HAMADA, Ryo KIKUCHI and Koji CHIDA, "O(1) Bits Communication Bit Decomposition and O(|p'|) Bits Communication Modulus Conversion for Small k secret-sharing-based Secure Computation", Computer Security Symposium 2013, 21-23 Oct. 2013

[NPL 3]

Toshinori Araki, Jun Furukawa, Yehuda Lindell, Ariel Nof and Kazuma Ohara, "High-Throughput Semi-Honest Secure Three-Party Computation with an Honest Majority", CCS '16 Proceedings of the 2016 ACM SIGSAC Conference on Computer and Communications Security, Pages 805-817

SUMMARY

The disclosures of Non Patent Literatures 1 to 3 given above are hereby incorporated in their entirety by reference into this specification. The following analysis is made by the inventors of the present invention.

As described above, according to NPL 2, bit decomposition can be performed by communication amount of 10n+4 bits, assuming that p is a number of n bits.

It is desirable to implement such a scheme whereby bit decomposition can be executed efficiently with a reduced communication amount, or, less than that of NPL 2, for example.

Accordingly, it is an object of the present invention to provide an apparatus, method, and program, each enabling bit decomposition and/or bit combining with less communication amount to realize efficient execution of secure computation.

According to an aspect of the present invention, there is provided a bit decomposition secure computing system comprising:

a share value storage apparatus to store share values obtained (distributed) by (2, 3) type RSS (Replication type Secret Sharing) using modulo of power of 2 arithmetic, a decomposed share value storage apparatus to store a sequence of share values obtained (distributed) by (2, 3) type RSS using modulo 2 arithmetic; and a bit decomposition secure computation apparatus, wherein with respect to sharing of a value w, r1, r2, and r3 randomly selected and satisfying w=r1+r2+r3 mod $2^n$, where ^ is a power operator and n is a preset positive integer, being used as share information by the (2, 3) type RSS stored in the share value storage apparatus, the bit decomposition secure computation apparatus includes:

an addition sharing unit that sums two values out of r1, r2 and r3 by modulo $2^n$ arithmetic, generates and distributes a share value with respect to the sum by the (2, 3) type RSS; and a full adder secure computation unit that executes addition processing of the value generated by the addition sharing unit and a value not used by the addition sharing unit, for each digit, by using secure computation of a full adder, and stores the result in the decomposed share value storage apparatus.

According to another aspect of the present invention, there is provided a bit decomposition secure computation system comprising:

a share value storage apparatus to store share values obtained (distributed) by (2, 3) type RSS (Replication type Secret Sharing) using modulo of power of 2 arithmetic;

a decomposed share value storage apparatus to store a sequence of share values obtained (distributed) by applying (2, 3) type RSS using modulo 2 arithmetic; and a bit decomposition secure computation apparatus, wherein with respect to sharing of a value w, r1, r2, and r3 randomly selected and satisfying w=r1+r2+r3 mod $2^n$, where ^ is a power operator and n is a preset positive integer, being used as share information by the (2, 3) type RSS stored in the share value storage apparatus, the bit decomposition secure computation apparatus includes a full adder secure computation unit that performs secure computation of r12=r1+r2 mod $2^n$ and secure computation of r123=r12+r3 mod $2^n$, for each digit, by using secure computation of a full adder, and stores the computation result in the decomposed share value storage apparatus.

According to a further aspect of the present invention, there is provided a bit combining secure computing system comprising:

a share value storage apparatus to store share values obtained (distributed) by (2, 3) type RSS (Replication type Secret Sharing) using modulo of power of 2 arithmetic;

a decomposed share value storage apparatus to store a sequence of share values obtained (distributed) by (2, 3) type RSS using modulo 2 arithmetic; and a bit combining secure computation apparatus, wherein with respect to sharing of a value $w\_i$, $r\_\{1, i\}$, $r\_\{2, i\}$, $r\_\{3, i\}$ randomly selected and satisfying $w\_i$=$r\_\{1, i\}$+$r\_\{2, i\}$+$r\_\{3, i\}$ mod 2, for i=1 to n, being used as a sequence of n items of share information by the (2, 3) type RSS stored in the decomposed share value storage apparatus, the bit combining secure computation apparatus includes a full adder secure computation unit that performs secure computation of r12=$r\_\{1, n\}$∥ . . . ∥$r\_\{1, 1\}$+$r\_\{2, n\}$∥ . . . ∥$r\_\{2, 1\}$ mod $2^n$, where a symbol ∥ is a concatenation operator, ^ is a power operator and n is a preset positive integer, and performs secure computation of r123=r12+$r\_\{3, n\}$∥ . . . ∥$r\{3, 1\}$ mod $2^n$, for each digit, by using secure computation of a full adder, and stores the computation result in the share value storage apparatus.

According to an aspect of the present invention, there is provided a method in a computer system for providing bit decomposition secure computing, the method comprising:

an addition sharing step that sums two values out of r1, r2 and r3 by modulo $2^n$, generates and distributes a share value by the (2, 3) type RSS (Replication type Secret Sharing) scheme with respect to the sum, wherein with respect to sharing of a value w, r1, r2, and r3 randomly selected and satisfying w=r1+r2+r3 mod $2^n$, where ^ is a power operator and n is a preset positive integer, are used as share information by the (2, 3) type RSS stored in a share value storage apparatus to store share values obtained (distributed) by (2, 3) type RSS using modulo of power of 2 arithmetic; and a full adder secure computation step that executes addition processing of the value generated by the addition sharing step and a value not used by the addition sharing step, for each digit, by using secure computation of a full adder, and stores the result in a decomposed share value storage apparatus to store a sequence of share values obtained (distributed) by (2, 3) type RSS using modulo 2 arithmetic.

According to another aspect of the present invention, there is provided a method in a computer system for providing bit decomposition secure computing, the method comprising a full adder secure computation step that performs secure computation of r12=r1+r2 mod $2^n$ and secure computation of r123=r12+r3 mod $2^n$, for each digit, by using secure computation of a full adder, wherein with respect to sharing of a value w, r1, r2, and r3 randomly selected and satisfying w=r1+r2+r3 mod $2^n$, where ^ is a power operator and n is a preset positive integer, are used as share information by the (2, 3) type RSS (Replication type Secret Sharing) scheme stored in a share value storage apparatus to store share values obtained (distributed) by (2, 3) type RSS using modulo of power of 2 arithmetic; and stores the computation result in a decomposed share value storage apparatus to store a sequence of share values obtained (distributed) by (2, 3) type RSS using modulo 2 arithmetic.

According to a further aspect of the present invention, there is provided a method in a computer system for providing bit combining secure computing, the method comprising a full adder secure computation step that performs secure computation of r12=$r\_\{1, n\}$∥ . . . ∥$r\_\{1, 1\}$+$r\_\{2, n\}$∥ . . . ∥$r\_\{2, 1\}$ mod $2^n$, where a symbol ∥ is a concatenation operator, ^ is a power operator and n is a preset positive integer, and performs secure computation of r123=r12+$r\_\{3, n\}$∥ . . . ∥$r\_\{3, 1\}$ mod $2^n$, for each digit by secure computation of a full adder, wherein with respect to sharing of a value $w\_i$, $r\_\{1, i\}$, $r\_\{2, i\}$, $r\_\{3, i\}$ randomly selected and satisfying $w\_i$=$r\_\{1, i\}$+$r\_\{2, i\}$+$r\_\{3, i\}$ mod 2, for i=1 to n, are used as a sequence of n items of share information by the (2, 3) type RSS stored in a decomposed share value storage apparatus to store a sequence of share values obtained (distributed) by (2, 3) type RSS using modulo 2 arithmetic; and stores the computation results in a share value storage apparatus to store share values obtained (distributed) by (2, 3) type RSS using modulo of power of 2 arithmetic.

According to an aspect of the present invention, there is provided a program causing a computer to execute bit decomposition secure computing processing comprising:

an addition sharing process that sums two values out of r1, r2 and r3 by modulo $2^n$, generates and distributes a share value by the (2, 3) type RSS (Replication type Secret Sharing) scheme with respect to the sum, wherein with respect to sharing of a value w, r1, r2, and r3 randomly selected and satisfying w=r1+r2+r3 mod $2^n$, where ^ is a power operator and n is a preset positive integer, are used as share information by the (2, 3) type RSS stored in a share value storage apparatus to store share values obtained (distributed) by (2, 3) type RSS using modulo of power of 2 arithmetic; and a full adder secure computation process that executes addition processing of the value generated by the addition sharing process and a value not used by the addition sharing process, for each digit, by using secure computation of a full adder, and stores the result in a decomposed share value storage apparatus to store a sequence of share values obtained (distributed) by (2, 3) type RSS using modulo 2 arithmetic.

According to another aspect of the present invention, there is provided a program causing a computer to execute bit decomposition secure computing processing comprising:

a full adder secure computation process that performs secure computation of r12=r1+r2 mod $2^n$ and secure computation of r123=r12+r3 mod $2^n$, for each digit, by using secure computation of a full adder, wherein with respect to sharing of a value w, r1, r2, and r3 randomly selected and satisfying w=r1+r2+r3 mod $2^n$, where ^ is a power operator and n is a preset positive integer, are used as share information by the (2, 3) type RSS (Replication type Secret Sharing) scheme stored in a share value storage apparatus to store share values obtained (distributed) by (2, 3) type RSS using modulo of power of 2 arithmetic; and stores the computation result in a decomposed share value storage apparatus to store a sequence of share values obtained (distributed) by (2, 3) type RSS using modulo 2 arithmetic.

According to a further aspect of the present invention, there is provided a program causing a computer to execute bit combining secure computing processing comprising:

a full adder secure computation process that performs secure computation of r12=r_{1, n}|| . . . ||r_{1, 1}+r_{2, n}|| . . . ||r_{2, 1} mod $2^n$, where a symbol II is a concatenation operator, ^ is a power operator and n is a preset positive integer, and performs secure computation of r123=r12+r_{3, n}|| . . . ||r_{3, 1} mod $2^n$, for each digit by secure computation of a full adder, wherein with respect to sharing of a value w_i, r_{1, i}, r_{2, i}, r_{3, i} randomly selected and satisfying w_i=r_{1, i}+r_{2, i}+r_{3, i} mod 2, for i=1 to n, are used as a sequence of n items of share information by the (2, 3) type RSS stored in a decomposed share value storage apparatus to store a sequence of share values obtained (distributed) by (2, 3) type RSS using modulo 2 arithmetic;

stores the computation results in a share value storage apparatus to store share values obtained (distributed) by (2, 3) type RSS using modulo of power of 2 arithmetic.

According to yet another aspect of the present invention, there is provided a non-transitory computer-readable recording medium storing therein the above program, such as a semiconductor memory such as random access memory (RAM), a read only memory (ROM), an electrically erasable programmable read-only memory (EEPROM), a universal serial bus (USB) device, and solid state drive (SSD), or a storage device such as a Hard Disk Drive(HDD), a Compact Disc (CD), or Digital Versatile Disc (DVD) and so forth.

According to the present invention, bit decomposition and/or bit combining can be executed with less communication amount to make secure computation more efficient.

Still other features and advantages of the present invention will become readily apparent to those skilled in this art from the following detailed description in conjunction with the accompanying drawings wherein only example embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is a diagram illustrating an arrangement of a first example embodiment.

FIG. 2 is a flowchart illustrating an operation of the first example embodiment of the present invention.

FIG. 3 is a diagram illustrating an arrangement of a second example embodiment.

FIG. 4 is a flowchart illustrating an operation of the second example embodiment of the present invention.

FIG. 5 is a diagram illustrating an arrangement of a third example embodiment.

FIG. 6 is a flowchart illustrating an operation of the third example embodiment of the present invention.

FIG. 7 is a diagram illustrating an arrangement of a fourth example embodiment of the present invention.

DETAILED DESCRIPTION

Example embodiments will be described with reference to drawings. According to the method of the above described NPL 2, sharing of r3 is performed in the above described Procedure 1. A method for executing this processing without communication will be described.

Suppose that sharing of a value is performed by using r1, r2, and r3 satisfying r=r1+r2+r3 mod p as shares.

When generating shares related to ri (i=1, 2, 3) satisfying r=r1+r2+r3 mod p, the value obtained by setting all the values to zero other than a portion relating ri of share information of r=r1+r2+r3 mod p is the share information of ri.

Suppose that the apparatus 1 retains (r2, r3), the apparatus 2 retains (r3, r1), and the apparatus 3 retains (r1, r2).

For example, if all other than a portion relating to r1 are set to zero, the apparatus 1 will possess (0, 0), the apparatus 2 will possess (0, r1), and the apparatus 3 will possess (r1, 0), which can be made share information of r1.

The fact that the apparatuses 2 and 3 retain r1 itself has no influence on confidentiality. This is because they are values that can be grasped originally. Similarly, for r2 and r3, the share information can be obtained without communicating among apparatuses.

The reason that s is added in the above described Procedure 3, i.e., r12+r3+s mod $2^n$, according to the method according to NPL 2, is to obtain r12+r3 mod p, by the secret computation of mod $2^n$.

In the case of s=1, if r12+r3=r'+p, where p=$2^n$−1, then the following holds:

$$r12+r3+s \bmod 2^n = r'+p+1 \bmod 2^n = r'+2^n \bmod 2^n = r' \bmod 2^n.$$

In the case of s=0, if it is assumed that r12+r3=r', then r12+r3+s mod $2^n$=r' mod $2^n$.

From above, irrespective of the value of s, the computation result of the above described Procedure 3 is r12+r3 mod $2^n$.

However, if 2 n is used as p, the processing (the above described Procedure 2) that is executed when r12+r3 exceeds $2^n$ is unnecessary.

<Modes>

The following describes the bit decomposition method with the above described modification added as one of modes of the present invention.

<Procedure 1>

Execute sharing of r12=r1+r2 mod $2^n$.

<Procedure 2>

Generate share of r3 on each apparatus.

<Procedure 3>

Execute secret computation of a full adder for each bit from a lower digit to compute r12+r3+s mod $2^n$.

The following evaluates a communication amount of the above processing.

Let r1, r2, and r3 satisfying w=r1+r2+r3 mod $2^n$ be randomly selected and be stored as follows.

(r1, r2) is stored as a share value of w in the apparatus 1.

(r2, r3) is stored as a share value of w in the apparatus 2.

(r3, r1) is stored as a share value of w in the apparatus 3.

<Communication Amount of Procedure 1>

Distribution of r1+r2 is performed by the apparatus 1. First, the apparatus 1 computes $r12=r1+r2 \bmod 2^n$ and randomly selects r12A and r12B satisfying $r12A+r12B=r12 \bmod 2^n$.

Next, the apparatus 1 sends r12A and 12B to the apparatus 2 and the apparatus 3, respectively.

At this time, the apparatus 1 obtains (r12B, r12A) as a share value of r12,
the apparatus 2 obtains (r12A, 0) as a share value of r12, and
the apparatus 3 obtains (0, r12B) as a share value of r12.

In this process, 2n bit communication is performed.

<Communication Amount of Procedure 2>

As described above, share information of r3 can be generated without communication.

<Communication Amount of Procedure 3>

The secure computation of an full adder requires one AND operation to calculate carry of each digit. Therefore, in the case of addition of n digits, communication of $3*(n-1)$ bits is required.

As a result, it can be seen that the bit decomposition can be calculated with the communication amount of 5n−3 bits. The following describes an example for explaining how to divide the computation result into bit units by processing of an adder.

The computation process of decomposition with be described for p=8, r=6 (110 in binary representation), r1=3 (011 in binary representation), r2=2 (010 in binary representation), r3=1 (001 in binary representation).

Let j-th digit of r_i from a lowest digit be ri_j, j-th digit of r1r2 mod 8 be r12_j, and j-th digit of r1+r2+r3 mod 8 be r123_j.

Next, a procedure for computing $$r12+r3 \bmod 8 = 5+1 \bmod 8 = 6$$

from the lowest digit will be described.

<First Digit>

Computation of the first digit is as follows:

$$r123\_1 = r12\_1 \text{ XOR } r3\_1 = 0 \text{ XOR } 1 \text{ XOR } 1 = 0,$$

where XOR is a bitwise exclusive OR.

Carry with respect to the computation of the first digit is as follows:

$$c1 = r12\_1 \text{ AND } r3\_1 = 1 \text{ AND } 1 = 1$$

(In the first digit, there is no carry (carry) from a lower digit.)

<Second Digit>

Computation of the second digit is as follows:

$$r123\_2 = r12\_2 \text{ XOR } r3\_2 \text{ XOR } c1 = 0 \text{ XOR } 0 \text{ XOR } 1 = 1$$

Carry with respect to the computation of the second digit is as follows:

$$c2 = c1 \text{ XOR } (1 \text{ XOR } r12\_2 \text{ XOR } r3\_2) \text{ AND } (r3\_2 \text{ XOR } c1) = 1 \text{ XOR } (1 \text{ XOR } 0 \text{ XOR } 0) \text{ AND } (0 \text{ XOR } 1) = 0$$

<Third Digit>

Computation of the third digit is as follows:

$$r123\_3 = r12\_3 \text{ XOR } r2\_3 \text{ XOR } c2 = 1 \text{ XOR } 0 \text{ XOR } 0 = 1$$

As described above, it is possible to compute the value obtained by decomposing each digit bit by bit, with one AND processing, as with 123_1=0, r123_2=1, and r123_3=1. This process can be executed by secure computation. The result of the secure computation is a share value of the value obtained by decomposition for each bit.

In the above case, as (2, 3) threshold type RSS, the apparatus 1 holds (r1, r2),
the apparatus 2 holds (r2, r3), and
the apparatus 3 holds (r3, r1), with the value w given as follows:

$$w = r1+r2+r3 \bmod p.$$

However, the present invention is applicable as long as it is a (2, 3) threshold type RSS that holds information corresponding to two different values among three values of r1, r2, and r3. For example, the apparatus 2 may hold (r2+r3, r3) instead of (r2, r3), or even a method can me also implemented in which the apparatus 2 holds (r2−r3, r2+r3), and so forth, as long as a secure computation is equipped with addition, multiplication and constant.

Alternatively, at first, $r12=r1+r2 \bmod 2^n$ is calculated by secure computation, and then operation on r12+r3 may be executed by secure computation a full adder. When using this method, the communication amount for calculating r12 is 3n bits, which is rather inefficient as compared with a case where the apparatus 1 distributes, but the total communication amount is 6n−3 bits.

When computation of r1+r2 is performed by secure computation of a full adder, there is no need to perform computation for a carry generated from the most significant digit, so computation on r12 can be executed by a communication amount of 3 n−3 bit. In this case, it is possible to execute bit decomposition with the communication amount of 6n−6 bits.

These variations are also more efficient than the method according to NPL 2.

Also, if both processing ($r12=r1+r2 \bmod 2^n$ and $r12+r3 \bmod 2^n$) are to be executed using secure computation of a full adder, it is possible to use a mechanism for giving tolerance against fraud on the secure computation method using (2, 3) type RSS as described in NPL 3.

Furthermore, it is also possible to create share information for a combined value from bit decomposed share information. Carry computation for each carry from a low order digit to a high order digit is executed by secure computation and when carry computation for the entire digits is finished, the secure computation result of each digit are combined.

In this method, since there is no subject (party) holding information equivalent to $r1+r2 \bmod 2^n$, both $r12=r1+r2 \bmod 2^n$, and $r12+r3 \bmod 2^n$ are computed by secure computation of a full adder.

When computation of the full adder is executed sequentially from a lower digit, n−1 AND operations are generated. As a result, the number of times of communication is n−1. In order to reduce this number, a carry save adder may be used, in which the number of AND operations increases but a depth of the circuit can be made shallow.

EXAMPLE EMBODIMENTS

Configuration and operation of a first embodiment of the present invention will be described with reference to the drawings.

Example Embodiment 1

In the first embodiment, when sharing of w is performed by a (2, 3) type RSS scheme using r1, r2, and r3 which are randomly selected to satisfy $w=r1+r2+r3 \bmod 2^n$, one apparatus distributes $r12=r1+r2 \bmod 2^n$ and executes r12+ r3 mod 2^n by using secure computation of a full adder, thereby generating bit decomposed share information.

FIG. 1 is a block diagram illustrating an arrangement of the first example embodiment of the present invention. Referring to FIG. 1, a bit decomposition secure computing system 10 according to the first embodiment of the present invention includes a share value storage apparatus 100 that stores share values obtained by applying (2, 3) type RSS using 2^n as p, a decomposed share value storage apparatus 200 that stores bit decomposed share information, and a bit decomposition secure computation apparatus 300 that reads share values stored in the share value storage apparatus 100 and stores bit decomposed values in the decomposed share value storage apparatus 200.

In the first example embodiment, there are provided three sets of apparatuses, wherein the apparatuses 100, 200, and 300 in FIG. 1 constitute one set. That is, there are provided three sets of the systems 10. The apparatuses 100, 200, and 300 or any two apparatuses selected from the apparatuses 100, 200, and 300 may be arranged in one unit, or may be arranged in a distributed manner wherein, for example, at least between the apparatuses 100 and 200 and between the apparatuses 200 and 300, there may be provided one or more communication paths such as local area network (LAN) and/or wide area network (WAN). Note that in FIG. 1, arrowed lines between the apparatuses 100 and 300 and between the apparatuses 300 and 200 each only indicate an example of data flow. The communications between the apparatuses 100 and 300 and between the apparatuses 300 and 200 are as a matter of course not limited to the direction of the arrowed line. The same can be said in later-described other embodiments.

The share value storage apparatus 100 includes a first share value storage unit 101 and a second share value storage unit 102. The first share value storage unit 101 and the second share value storage unit 102 store respectively share values (first share and second share) in such a way that it can be understood which values out of the three values used for generating share information by the (2, 3) type RSS scheme are used and how the values are processed to obtain the stored share value.

The decomposed share value storage apparatus 200 includes a first decomposed share value storage unit 201 and a second decomposed share value storage unit 202. The first decomposed share value storage unit 201 and the second decomposed share value storage unit 202 store respectively the share information (first share value and second share value) in such a way that it can be understood which share values out of the three values used for generating share information by the (2, 3) type RSS scheme are used and how the values are processed to obtain the stored share information.

The bit decomposition secure computation apparatus 300 includes an addition sharing unit 301, a partial share information extraction unit 302, and a full adder secure computation unit 303. The bit decomposition secure computation apparatus 300 reads share values stored in the first share value storage unit 101 and the second share value storage unit 102 of the share value storage apparatus 100, communicates with another bit decomposition secure computation apparatus 300 (not shown), and stores information (bit decomposed share value) in the first decomposed share value storage unit 201 and the second decomposed share value storage unit 202 of the decomposed share value storage apparatus 200.

The addition sharing unit 301, using two indices out of the three values constituting share information by (2, 3) type RSS, as inputs, reads share value(s) stored in the share value storage apparatus 100. If the share value storage apparatus 100 stores share values of both two indices, the addition sharing unit 301 generates share information by the (2, 3) type RSS with respect to a sum of the share values of the two indices and sends the generated share information to the addition sharing units 301 of other two apparatuses (not shown).

The partial share information extraction unit 302, using one index out of the three values constituting share information by (2, 3) type RSS scheme, as input, reads the value stored in the share value storage apparatus 100, and generates share information obtained by setting values to zero except for one of the three values constituting the share information by (2, 3) type RSS scheme.

The full adder secure computation unit 303 performs addition processing using secure computation of a full adder on the share information by (2, 3) type RSS generated and distributed by the addition sharing unit 301 and the share information by (2, 3) type RSS scheme generated by the partial share information extraction unit 302, and stores the value obtained by combining the share information of the computation result for each bit obtained for each bit in the decomposed share value storage apparatus 200.

FIG. 2 is a flowchart illustrating an operation of the first example embodiment of the present invention. It is assumed that in the share value storage apparatus 100, share values that are shared with the (2, 3) type RSS by using $r\_1$, $r\_2$, and $r\_3$ satisfying $r=r\_1+r\_2+r\_3$ mod $2^n$ are stored.

In the operation of the first example embodiment, $$r\_ij = r\_i + r\_j \text{ mod } 2^n \text{ is shared, and}$$

addition of $r\_ij$ and $r\_k$ is executed by secure computation of a full adder.

Any combination of i, j, and k may be used as long as i, j and k are values different to each other and selected from a combination of values 1, 2 and 3.

The following processing is executed by 3 sets of share value storage apparatuses 100, decomposed share value storage apparatuses 200, and bit decomposition secure computation apparatuses 300.

First, each addition sharing unit 301 decides whether or not the share value storage apparatus 100 associated with the bit decomposition secure computation apparatus 300 stores information on $r\_i$ and $r\_j$. When stored, each addition sharing unit 301 computes $r\_ij = r\_i + r\_j$ mod $2^n$ and then sends the computed result to the addition sharing unit 301 of the other two bit decomposition secure computation apparatuses 300. After that, each addition sharing unit 301 outputs the share information of $r\_ij$ (Step A1).

Next, the partial share information extraction unit 302 produces partial share information in which values other than the portion related to $r\_k$ are set to 0 from the values stored in the share value storage apparatus 100 (Step A 2).

Next, the full adder secure computation 303 executes addition processing using secure computation of a full adder with respect to the share information of $r\_ij$ and the share information of $r\_k$, and then stores a sequence of the results in the decomposed share value storage apparatus 200 (Step A3).

Example Embodiment 2

The following describes configuration and operation of a second example embodiment of the present invention with reference to the drawings.

In the second example embodiment, when w is shared by (2, 3) type RSS scheme using r1, r2, and r3 satisfying w=r1+r2+r3 mod $2^n$, r12=r1+r2 mod $2^n$ is computed by secure computation of a full adder, and r12+r3 mod $2^n$ is computed from lower order bits by secure computation of a full adder.

FIG. 3 is a block diagram illustrating an arrangement of a second example embodiment of the present invention. Referring to FIG. 3, a bit decomposition secure computing system 10A according to the second embodiment of the present invention includes a share value storage apparatus 100 that stores share values obtained by applying (2, 3) type RSS scheme using $2^n$ as p, a decomposed share value storage apparatus 200 that stores bit decomposed share information, a bit decomposition apparatus 300A that reads share values stored in the share value storage apparatus 100 and stores bit decomposed values in the decomposed share value storage apparatus 200.

There are provided three sets of apparatuses, where apparatuses 100, 200, and 300 in FIG. 1 constitute one set, as with the first example embodiment. That is, there are provided three sets of the systems 10A.

The share value storage apparatus 100 includes a first share value storage unit 101 and a second share value storage unit 102. The first share value storage unit 101 and the second share value storage unit 102 store share values in such a way that it can be understood which values out of the three values used for generating share information by (2, 3) type RSS are used and how the values are processed to obtain the stored share value.

The decomposed share value storage apparatus 200 includes a first decomposed share value storage unit 201 and a second decomposed share value storage unit 202. The first decomposed share value storage unit 201 and the second decomposed share value storage unit 202 store the values (bit decomposed share values) in such a way that it can be understood which values out of the three values used for generating share information by (2, 3) type RSS are used and how the values are processed to obtain the stored share value.

The bit decomposition secure computation apparatus 300 includes a partial share information extraction unit 302 and a full adder secure computation unit 303.

The bit decomposition secure computation apparatus 300A reads values stored in the share value storage apparatus 100, communicates with other two bit decomposition secure computation apparatuses 300A, and stores information in the decomposed share value storage apparatus 200.

The partial share information extraction unit 302 reads, using the index of one of the three values constituting share information by (2, 3) type RSS scheme, as an input, values stored in the share value storage apparatus 100, and generates share information obtained by setting values to zero except for one of the three values constituting the share information by (2, 3) type RSS.

The full adder secure computation apparatus 303A, using 3 sets of share information by the (2, 3) type RSS generated by the partial share information extraction unit 302 as inputs, executes secure computation of a full adder from low order bit, for the three values, and stores the share information of the computation result for each bit in the decomposed share value storage apparatus 200.

FIG. 4 is a flowchart illustrating an operation of the second example embodiment of the present invention.

In the share value storage apparatus 100, there are stored share values of n bit value r to be shared that have been obtained by applying (2, 3) type RSS scheme using r_1, r_2, and r_3, which satisfy r=r_1+r_2+r_3 mod $2^n$.

In the operation of the second example embodiment, r_ij=r_i+r_j mod $2^n$ is executed by secure computation of a full adder, and r_ij+r_k mod $2^n$ is executed by secure computation of a full adder, where i, j, and k are values different to each other and selected from a combination of values 1, 2 and 3.

The following processing is executed by the three sets of share value storage apparatuses 100, decomposed share value storage apparatuses 200, and bit decomposition secure computation apparatuses 300A.

First, the partial share information extraction unit 302 outputs partial share information in which values other than the portion related to r_i are regarded as 0 from the values stored in the share value storage apparatus 100. (Step B1)

Next, the partial share information extraction unit 302 outputs partial share information in which values other than the portion related to r_j are regarded as 0 from the values stored in the share value storage apparatus 100. (Step B2)

Next, the partial share information extraction unit 302 outputs partial share information in which values other than the portion related to r_k are regarded as 0 from the values stored in the share value storage apparatus 100. (Step B3)

Next, the full adder secure computation 303 executes secure computation of a full adder in descending order of the least significant bit with respect to the share information of r_i and the share information of r_j, and outputs a sequence of the results as the share information of r_ij. (Step B4)

Next, the full adder secure computation 303 executes secure computation of a full adder with respect to the share information of r_ij and the share information of r_k, and stores a sequence of the results in the decomposed share value storage apparatus 200. (Step B5).

Example Embodiment 3

The following describes a configuration and operation of a third example embodiment of the present invention with reference to the drawings.

In the third example embodiment, with respect to i= 1, ..., N, when a bit w_i is shared by (2, 3) type RSS using r_{1, i}, r_{2, i}, r_{3, i} satisfying w_i=r_{1, i}+r_{2, i}+r_{3, i} mod 2, where w_i, r_{1, i}, r_{2, i}, and r_{3, i} indicate respectively an i-th digit bit of w, r1, r2, and r3, bit combining is performed by executing by secure computation of a full adder, $$r12 = r\_\{1,n\} \| \ldots \| r\_\{1,1\} + r\_\{2,n\} \| r\_\{2,1\} \bmod 2^n;$$
and $$r12 = r12 + r\_\{3,n\} \| \ldots \| r\_\{3,1\} \bmod 2^n,$$

where a symbol ∥ is a bit concatenation operator.

FIG. 5 is a block diagram illustrating an arrangement of the third embodiment of the present invention. Referring to FIG. 5, a bit combining secure computing system 20 according to the third embodiment of the present invention comprises a share value storage apparatus 100 that stores share values obtained by applying (2, 3) type RSS using $2^n$ as p, a bit decomposed share value storage apparatus 200 that stores the share information, and a bit combining secure computation apparatus 400 that reads the values stored in the decomposed share value storage apparatus 200 and stores the values in the share value storage apparatus 100.

There are provided three sets of apparatuses, where apparatuses 100, 200, and 400 in FIG. 5 constitute one set. That is, there are provided three sets of the systems 20.

The share value storage apparatus 100 includes a first share value storage unit 101 and a second share value storage unit 102. The first share value storage unit 101 and the second share value storage unit 102 store share values in such a way that it can be understood which values out of the three values used for generating share information by (2, 3) type RSS scheme are used and how the values are processed to obtain the stored share value.

The decomposed share value storage apparatus 200 includes a first decomposed share value storage unit 201 and a second decomposed share value storage unit 202. The first decomposed share value storage unit 201 and the second decomposed share value storage unit 202 store share values in such a way that it can be understood which values out of the three values used for generating share information by (2, 3) type RSS are used and how the values are processed to obtain the stored share value.

The bit combining secure computation apparatus 400 includes a partial share information extraction unit 302, and a full adder secure computation unit 303.

The bit combining secure computation apparatus 400 reads values stored in the decomposed share value storage apparatus 200, communicates with other binding secure computation apparatuses 400 and stores information in the share value storage apparatus 100.

The partial share information extraction unit 302 extracts, using an index of one of three values constituting share information by (2, 3) type RSS, as an input, reads the value stored in the decomposed share value storage apparatus 200 and generates share information obtained by setting values to zero except for one of the three values constituting the share information by (2, 3) type RSS.

The full adder secure computation unit 303 receives, as inputs, 3 sets of share information by the (2, 3) type RSS generated by the partial share information extraction unit 302, executes secure computation of a full adder, from low order bit of respective three values, and then stores share information of the computation result for each bit in the share value storage apparatus 100.

FIG. 6 is a flowchart illustrating an operation of the third embodiment of the present invention. It is assumed that the decomposed share value storage apparatus 200 stores share values shared with (2,3) type RSS using $r\_\{1, i\}$, $r\_\{2, i\}$, $r\_\{3, i\}$ satisfying $ri=r\_\{1, i\}+r\_\{2, i\}+r\_\{3, i\}$ mod 2.

In the operation of the third example embodiment, $$r\_ij = r\_\{i,n\} \| \ldots \| r\_\{i,1\} + r\_\{j,n\} \| \ldots r\_\{j,1\} \mod 2^n$$

is executed by secure computation of a full adder, and $$r\_ij + r\_\{k,n\} \| \ldots r\_\{k,1\} \mod 2^n$$

is executed by secure computation of a full adder, where indices i, j, and k are values different to each other and selected from a combination of values 1, 2, and 3.

The following processing is executed by the three sets of share value storage apparatuses 100, decomposed share value storage apparatuses 200, and bit combining secure computation apparatuses 400.

First, the partial share information extraction unit 302 outputs partially decomposed share information in which values other than a portion related to $r\_\{i, n\} \| \ldots \| r\_\{i, 1\}$ are regarded as 0 from the values stored in the decomposed share storage apparatus 200 (Step C1).

Next, the partial share information extraction unit 302 extracts partially decomposed share information in which values other than a portion relating to $r\_\{j, n\} \| \ldots r\_\{j, 1\}$ are regarded as 0 from the values stored in the decomposed share value storage apparatus 200 (Step C2).

Next, the partial share information extraction unit 302 extracts partially decomposed share information in which values other than a portion relating to $r\_\{k, n\} \| \ldots \| r\_\{k, 1\}$ are regarded as 0 from the values stored in the decomposed share value storage apparatus 200 (Step C3).

Next, the full adder secure computation unit 303 performs secure computation of a full adder for partially decomposed share information of $r\_\{i, n\} \| \ldots \| r\_\{i, 1\}$ and partially decomposed share information of $r\_\{j, n\} \| \ldots \| r\_\{j, 1\}$ and outputs a sequence of the results, as share information of $r\_ij$ (Step C4).

Next, the full adder secure computation unit 303 performs secure computation of a full adder for the share information of $r\_ij$ and the partially decomposed share information of $r\_\{k, n\} \| \ldots \| r\_\{k, 1\}$, and stores the result in the share value storage apparatus 100 (Step C5).

The bit decomposition secure computing systems 10 and 10A in respectively described in the first and second embodiments may be implemented on a computer system as illustrated in FIG. 7, for example. Referring to FIG. 7, a computer system 500, such as a server system, includes a processor (Central Processing Unit) 502, a memory 504 including, for example, a semiconductor memory (for example, Random Access Memory (RAM), Read Only Memory (ROM), Electrically Erasable and Programmable ROM (EEPROM), and/or a storage device including at least one of Hard Disk Drive (HDD), Compact Disc (CD), Digital Versatile Disc (DVD) and so forth, a display device 506, and a communication interface 508. The communication interface 508 (such as a network interface controller (NIC)) may well be configured to communicate with other computer systems (parties) via LAN and/or WAN, for example. A program for executing the process of the bit decomposition secure computation apparatus in FIG. 1 or FIG. 3 is stored in a memory 504 and the processor 112 reads the program from the memory to execute the program to realize the bit decomposition secure computation. The memory 504 may includes the share value storage apparatus 100 and the decomposed Share value storage apparatus 200. The bit coupling secure computing system 20 in the third example embodiment may well be implemented on a computer system as illustrated in FIG. 7.

According to the first and second example embodiments, it is possible to convert share value shared by (2, 3) type RSS into a value in which each bit is shared by (2, 3) type RSS.

According to the third example embodiment, it is also possible to execute the reverse processing efficiently.

With the processing, it becomes possible to efficiently execute such complex processing that combines secure computation of values and secure computation of bits.

The disclosure of the aforementioned NPLs 1-3 is incorporated by reference herein. The particular exemplary embodiments or examples may be modified or adjusted within the scope of the entire disclosure of the present invention, inclusive of claims, based on the fundamental technical concept of the invention. In addition, a variety of combinations or selections of elements disclosed herein may be used within the concept of the claims. That is, the present invention may encompass a wide variety of modifications or corrections that may occur to those skilled in the art in accordance with the entire disclosure of the present invention, inclusive of claims and the technical concept of the present invention.

What is claimed is:

1. A bit decomposition secure computing system comprising:
    a share value storage apparatus to store share values obtained by applying (2, 3) type RSS (Replication type Secret Sharing) using modulo of power of 2 arithmetic;
    a decomposed share value storage apparatus to store a sequence of share values obtained by applying (2, 3) type RSS using modulo 2 arithmetic; and
    a bit decomposition secure computation apparatus including:
    a processor; and a memory storing a program executable by the processor, wherein the processor is configured to perform
    with respect to sharing of a value w,
    r1, r2, and r3 satisfying w=r1+r2+r3 mod 2^n, where mod is a modulo operator, ^is a power operator and n is a preset positive integer, being used as share information by the (2, 3) type RSS stored in the share value storage apparatus,
    an addition sharing process that sums two values out of r1, r2 and r3 by modulo 2^n arithmetic, generates and distributes a share value with respect to the sum by the (2, 3) type RSS; and
    a full adder secure computation process that executes addition processing of the value generated by the addition sharing process and a value not used by the addition sharing process, for each digit, by using secure computation of a full adder, and stores the result in the decomposed share value storage apparatus.

2. The bit decomposition secure computing system according to claim 1, wherein the processor in the bit decomposition secure computation apparatus is configured to perform
    a partial share information extraction process that, using one index out of three values constituting share information by the (2, 3) type RSS, as input, reads the value stored in the share value storage apparatus, and generates share information obtained by setting values to zero except for one of the three values constituting the share information by the (2, 3) type RSS, wherein
    the full adder secure computation process performs addition processing using secure computation of a full adder on the share information by the (2, 3) type RSS generated and distributed by the addition sharing process and the share information by the (2, 3) type RSS generated by the partial share information extraction process, and
    stores the value obtained by combining the share information of the computation result, for each bit, in the decomposed share value storage apparatus.

3. A bit decomposition secure computation system comprising:
    a share value storage apparatus to store share values obtained by applying (2, 3) type RSS (Replication type Secret Sharing) using modulo of power of 2 arithmetic;
    a decomposed share value storage apparatus to store a sequence of share values obtained by applying (2, 3) type RSS using modulo 2 arithmetic; and
    a bit decomposition secure computation apparatus including:
    a processor; and a memory storing a program executable by the processor, wherein the processor is configured to perform
    with respect to sharing of a value w,
    r1, r2, and r3 satisfying w=r1+r2+r3 mod 2^n, where mod is a modulo operator, ^n is a power operator and n is a preset positive integer, being used as share information by the (2, 3) type RSS stored in the share value storage apparatus,
    a full adder secure computation process that performs secure computation of r12=r1+r2 mod 2^n and secure computation of r123=r12+r3 mod 2^n, for each digit, by using secure computation of a full adder, and stores the computation result in the decomposed share value storage apparatus.

4. The bit decomposition secure computing system according to claim 3, wherein the processor in the bit decomposition secure computation apparatus is configured to perform
    a partial share information extraction process that, using one index out of three values constituting share information by the (2, 3) type RSS, as input, reads the value stored in the share value storage apparatus, and generates share information obtained by setting values to zero except for one of the three values constituting the share information by the (2, 3) type RSS, wherein
    the full adder secure computation process, using 3 sets of share information by the (2, 3) type RSS generated by the partial share information extraction process, including r_i, r_j, r_k, where i, j and k being different to each other and selected from 1 to 3,
    performs secure computation of r_ij=r_i+r_j mod 2^n, and secure computation of r_ij+r_k mod 2^n, by secure computation of a full adder, from low order bit, and
    stores a sequence of the computation result, for each bit in the decomposed share value storage apparatus.

5. A bit combining secure computing system comprising:
    a share value storage apparatus to store share values obtained by applying (2, 3) type RSS (Replication type Secret Sharing) using modulo of power of 2 arithmetic;
    a decomposed share value storage apparatus to store a sequence of share values obtained by applying (2, 3) type RSS using modulo 2 arithmetic; and
    a bit combining secure computation apparatus including:
    a processor; and a memory storing a program executable by the processor, wherein the processor is configured to perform
    with respect to sharing of a value w_i,
    r_{1, i}, r_{2, i}, r_{3, i} satisfying w_i=r{1, i}+r{2, i}+r_{3, i} mod 2, for i=1 to n, where w_i, r_{1, i}, r_{2, i}, and r_{3, i} indicate respectively an i-th digit bit of w, r1, r2, and r3, and mod is a modulo operator, being used as a sequence of n items of share information by the (2, 3) type RSS stored in the decomposed share value storage apparatus,
    a full adder secure computation process that performs secure computation of r12=r_{1, n}‖ . . . ‖r_{1, 1}+r_{2, n}‖ . . . ‖r_{2, 1} mod 2^n, where a symbol ‖ is a concatenation operator, ^ is a power operator and n is a preset positive integer, and performs secure computation of r123=r12+r_{3, n}‖ . . . ‖r_{3, 1} mod 2^n, for each digit, by using secure computation of a full adder, and stores the computation result in the share value storage apparatus.

6. The bit combining secure computing system according to claim 5, wherein the processor in the bit combining secure computation apparatus is configured to perform
    a partial share information extraction process that, using one index out of three values constituting share information by the (2, 3) type RSS, as input, reads the value stored in the share value storage apparatus, and generates share information obtained by setting values to zero except for one of the three values constituting the share information by the (2, 3) type RSS.

* * * * *